United States Patent [19]

Grange et al.

[11] Patent Number: 5,072,591
[45] Date of Patent: Dec. 17, 1991

[54] FLEXIBLE TRANSFER LINE EXHAUST GAS SHIELD

[75] Inventors: John A. Grange, Red Hook; Sadeg M. Faris, Pleasantville, both of N.Y.

[73] Assignee: HYPRES Incorporated, Elmsford, N.Y.

[21] Appl. No.: 422,759

[22] Filed: Oct. 17, 1989

[51] Int. Cl.⁵ ............................................. F17C 13/00
[52] U.S. Cl. ...................................... 62/50.7; 138/112; 138/114
[58] Field of Search .................. 62/50.7; 138/112, 114

[56] References Cited

U.S. PATENT DOCUMENTS

| | | | |
|---|---|---|---|
| 3,137,143 | 6/1964 | Jacobs et al. | 62/50.7 |
| 3,383,875 | 5/1968 | Haas | 62/50.7 |
| 3,386,256 | 6/1968 | Alexander | 62/50.7 |
| 3,440,830 | 4/1969 | Wright et al. | 62/50.7 |
| 3,466,886 | 9/1969 | Doose et al. | 62/50.7 |
| 3,706,208 | 12/1972 | Kadi et al. | 62/50.7 |
| 4,011,732 | 3/1977 | Doherty et al. | 62/50.7 |
| 4,036,618 | 7/1977 | Leonard et al. | 62/50.7 |
| 4,745,760 | 5/1988 | Porter | 62/50.7 |

*Primary Examiner*—Ronald C. Capossela
*Attorney, Agent, or Firm*—Kenyon & Kenyon

[57] ABSTRACT

A flexible transfer line for delivering coolant from a storage dewar to cool superconducting circuitry is provided with a delivery capillary coupled to the storage dewar, this capillary being thermally isolated from ambient temperatures. The transfer line has an outer flexible support coaxial with the delivery capillary, and an inner flexible shield between the delivery capillary and the outer flexible support. Heat in the shield is continuously removed to thereby provide the thermal isolation of the delivery capillary. The thermal isolation allows a low-flow rate of coolant through the delivery capillary since inefficiencies due to thermal conduction and radiation are substantially eliminated.

17 Claims, 2 Drawing Sheets

FLEXIBLE TRANSFER LINE EXHAUST GAS SHIELD

FIELD OF THE INVENTION

The present invention relates to the field of fluid transfer, and more specifically, to the transfer of liquid helium from a storage dewar via a flexible transfer line to effect cooling of superconducting circuitry.

BACKGROUND OF THE INVENTION

As is well known, superconducting circuitry requires maintenance at low temperatures in order to retain superconductivity characteristics. If coolant is used it must be transferred from a storage dewar to the superconducting circuitry. An example of a suitable coolant is liquid helium. For ease of handling, it is desirable that the transfer line be a flexible line.

It is advantageous for the transfer line to deliver liquid helium to the superconducting circuitry at a low flow rate in order to keep to a minimum the quantity of liquid helium used. A flexible liquid helium transfer line has previously been used which has a vacuum jacket of stainless steel flexible tubing. This known transfer line also has multiple layers of superinsulation surrounding a delivery tube.

The standard liquid helium transfer line described above does not work well at low-flow rates (below two liquid liters per hour), but is instead designed for fast transfer of bulk quantities from one storage dewar to another. One source of inefficiency at low-flow rates is that the external heat radiation impinging on the delivery tube is generated at room temperature, and is only partially shielded from the delivery tube due to imperfect insulation by the multi-layer insulation. Another source of inefficiency is the heat which is conducted from the vacuum jacket by supports which center and space the delivery tube from contact with the vacuum jacket. These inefficiencies cause the minimum flow rate necessary to achieve proper cooling of the superconducting circuitry to vary with the positioning of the flexible line.

Due to the above inefficiencies, using the standard transfer line to cool superconducting circuitry leads to the problems of high liquid helium consumption and high operating costs, since a higher rate of flow of liquid helium is needed to make up for the losses in the transfer line.

SUMMARY OF THE INVENTION

These and other problems are solved according to the present invention by providing a low-flow rate flexible transfer line. In one embodiment of the invention, the line comprises a delivery capillary which is coupled to a supply of liquid, an outer flexible support coaxial with the delivery capillary, and an inner flexible shield between the outer flexible support and the delivery capillary. The inner flexible shield provides thermal isolation of the delivery capillary from ambient temperatures. The line also has a means for removing heat from the shield such as a heat sink exposed to a cooling flow of gas, the exhaust gas flow from the cooled superconducting circuitry, which efficiently and economically cools the inner shield. A storage dewar thermally coupled to the inner flexible shield can also be used as a means for removing heat from the inner flexible shield.

The removal of heat from the inner flexible shield extracts the heat which impinges on the shield from external radiation from the outer tubing, as well as heat that is conducted by spacers which space the delivery capillary from the outer tubing. The delivery capillary is thereby substantially free of the inefficiencies due to radiation and thermal conduction so that liquid helium can be delivered at an advantageous low-flow rate.

Another embodiment of the present invention is an arrangement for cooling circuitry. The arrangement has a cooling housing which houses the object, and a storage dewar coupled to the cooling housing which contains a supply of coolant. A flexible transfer line of this invention is coupled between the storage dewar and the cooling housing. The transfer line has a delivery capillary which delivers coolant from the storage dewar into the cooling housing to cool the circuitry. An outer flexible support is coaxial with the delivery capillary, and an inner flexible shield is arranged between the outer tubing and the delivery capillary. This shield functions as described above.

The present invention is also directed to a method of transferring coolant at a low-flow rate from a storage supply to an area to be cooled. The method comprises the steps of delivering the coolant at a low-flow rate via a low-flow delivery capillary coupled between the storage supply and the area to be cooled, and thermally isolating the delivery capillary from ambient temperature. The isolating step includes providing an outer flexible support coaxial with the delivery capillary and an inner flexible shield between the outer flexible support and the delivery capillary. The method also includes the step of continuously extracting heat from the inner flexible shield.

The apparatus and method described above solve the problem of cooling inefficiencies inherent in the prior art transfer line, thus permitting use of a low-flow rate of transfer of coolant, which is more economical.

DETAILED DESCRIPTION

Figure 1:
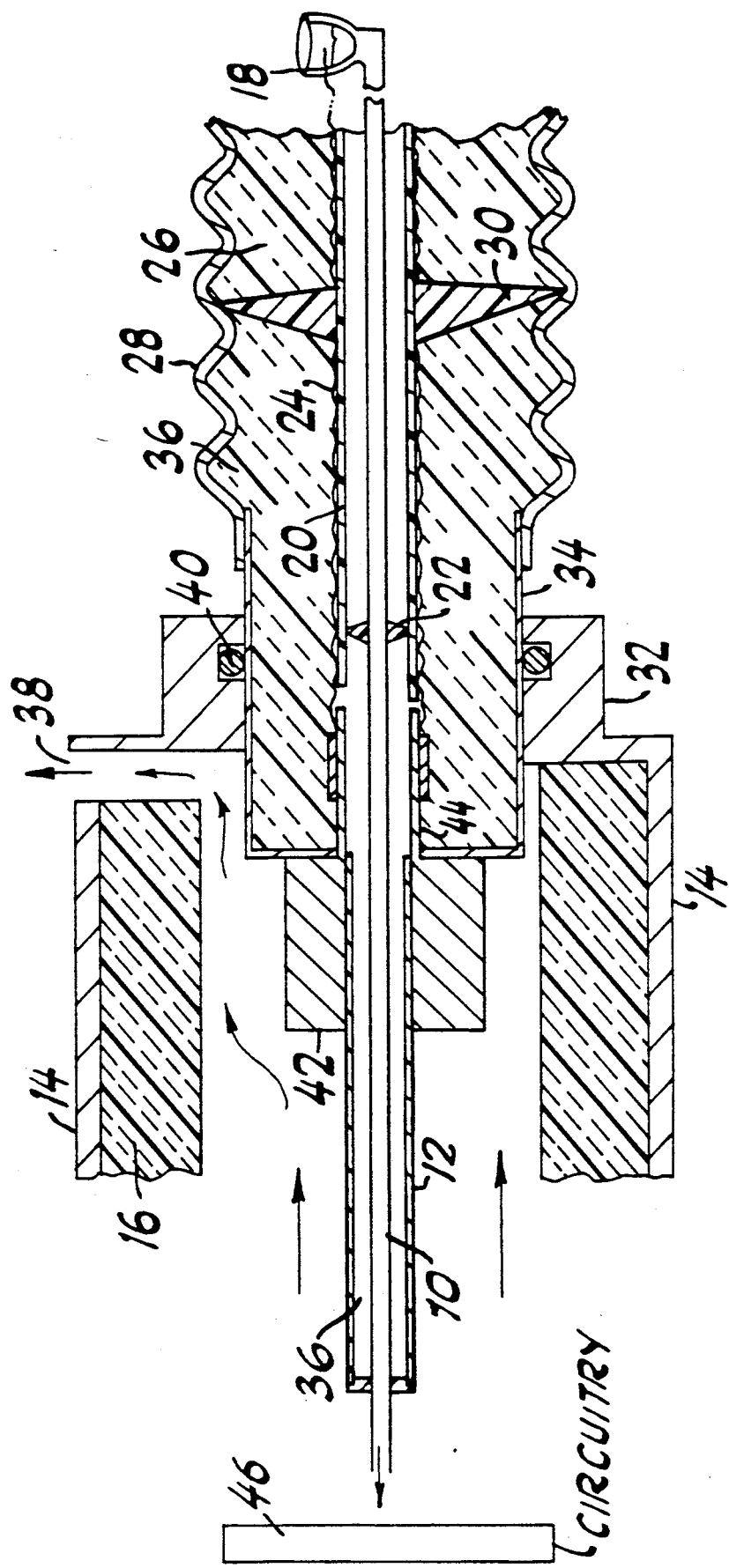
FIG. 1 is a cross-sectional view of an embodiment of the present invention.

An embodiment of the present invention is illustrated in FIG. 1. A coolant for cooling superconducting circuitry 46 is delivered through a delivery capillary 10 that is conventionally connected to the circuitry 46 and of a diameter that allows a low coolant flow rate. The coolant can be liquid helium, for example.

The delivery capillary 10 is arranged within a delivery capillary vacuum jacket 12 that is itself arranged within a cooling housing 14. The cooling housing 14 has insulation 16 to insulate the delivery capillary vacuum jacket 12. The delivery capillary 10 is connected at one end to a supply dewar 18 which contains the supply of liquid helium carried by the delivery capillary 10 to the superconducting circuitry 46.

A support tube 20 made of a low-thermal conductivity material, such as teflon, supports the delivery capillary 10 outside of the cooling housing 14. Inside of the teflon support tube 20 is an inner spacer 22, which can also be made of teflon, which spaces the delivery capillary 10 from contact with the teflon support tube 20.

A shield 24 comprising flexible metal braid or tape is wrapped around the teflon support tube 20. Around this shield 24 is a superinsulation layer 26 to insulate the shield 24 from heat. Surrounding the superinsulation layer 26 is outer flexible support 28 which surrounds the delivery capillary 10, the shield 24 and superinsulation layer 26 between the cooling housing 14 and the supply dewar 18. The shield 24 is kept centered and spaced from contact with the outer flexible support 28 by the use of an outer spacer 30 made of low-thermal conductivity material, such as teflon.

The cooling housing 14 has a flange 32 through which the delivery capillary 10 extends. A connector piece 34 surrounds the superinsulation layer 26 within the flange 32, and serves as a transition piece from the outer flexible support 28 outside of the cooling housing 14 into the cooling housing 14.

A vacuum space 36 is created in both the outer flexible support 28 and within the delivery tube vacuum jacket 12 to further insulate the delivery capillary 10. As indicated by the arrows in FIG. 1, the gas which is exhausted after the superconducting circuitry 46 is cooled, flows through the cooling housing 14. An exhaust vent 38 directs the flow of exhaust gas out of the cooling housing 14. An exhaust gas seal 40 seals the coupling between the connector piece 34 and the cooling housing flange 32 so that all of the exhaust gas will exit the housing 14 through the exhaust vent 38.

As mentioned earlier, it is desirable to isolate the delivery capillary 10 as much as possible in order to allow a low-flow rate delivery of liquid helium. For this reason, there is no direct connection between the outer flexible support 28 and the delivery capillary 10 which could introduce heat through the point to point connections of teflon spacers. Instead, there is a connection through the first set of teflon spacers between the outer flexible support 28 and the shield 24, and a connection through the second set of teflon spacers between the teflon support tube 20 (supported by the shield 24) and the delivery capillary 10. Thus, there is no direct connection of the delivery capillary 10 and the outer flexible support 28.

The shield 24 is conductively cooled to further ensure that the delivery capillary 10 is not heated due to external radiation from the outer flexible support 28 or conduction through teflon spacers 22, 30. In the embodiment illustrated in FIG. 1, the shield 24 is thermally connected to a finned heat sink 42 arranged in the cooling housing 14 coaxially around the delivery capillary vacuum jacket 12. The heat sink 42 has a projection 44 that extends into the connector piece 34, with the shield 24 being connected to this projection 44 so as to provide a high degree of thermal conduction between the heat sink 42 and the shield 24. This connection can be made by soldering, for example.

The exhaust gas from the superconducting circuitry 46 is still relatively cold, and able to effectively cool a surface. Since the fins of the heat sink 42 are arranged in the exhaust gas flow in the cooling housing 14, the heat sink 42 is constantly cooled by the exhaust gas flow. The shield 24, through the thermal connection with the projection 44, is kept at a cold temperature. In other words, the exhaust gas flowing over the heat sink 42 effectively extracts the heat impinging on the shield 24 from external radiation from the outer flexible support 28, as well as heat conducted to the shield 24 by the outer teflon spacers 30. By extracting the heat impinging on or conducted to the shield 24, the delivery capillary 10 is thermally isolated from this heat. This allows the delivery capillary 10 to deliver the liquid helium at a low-flow rate.

Figure 2:
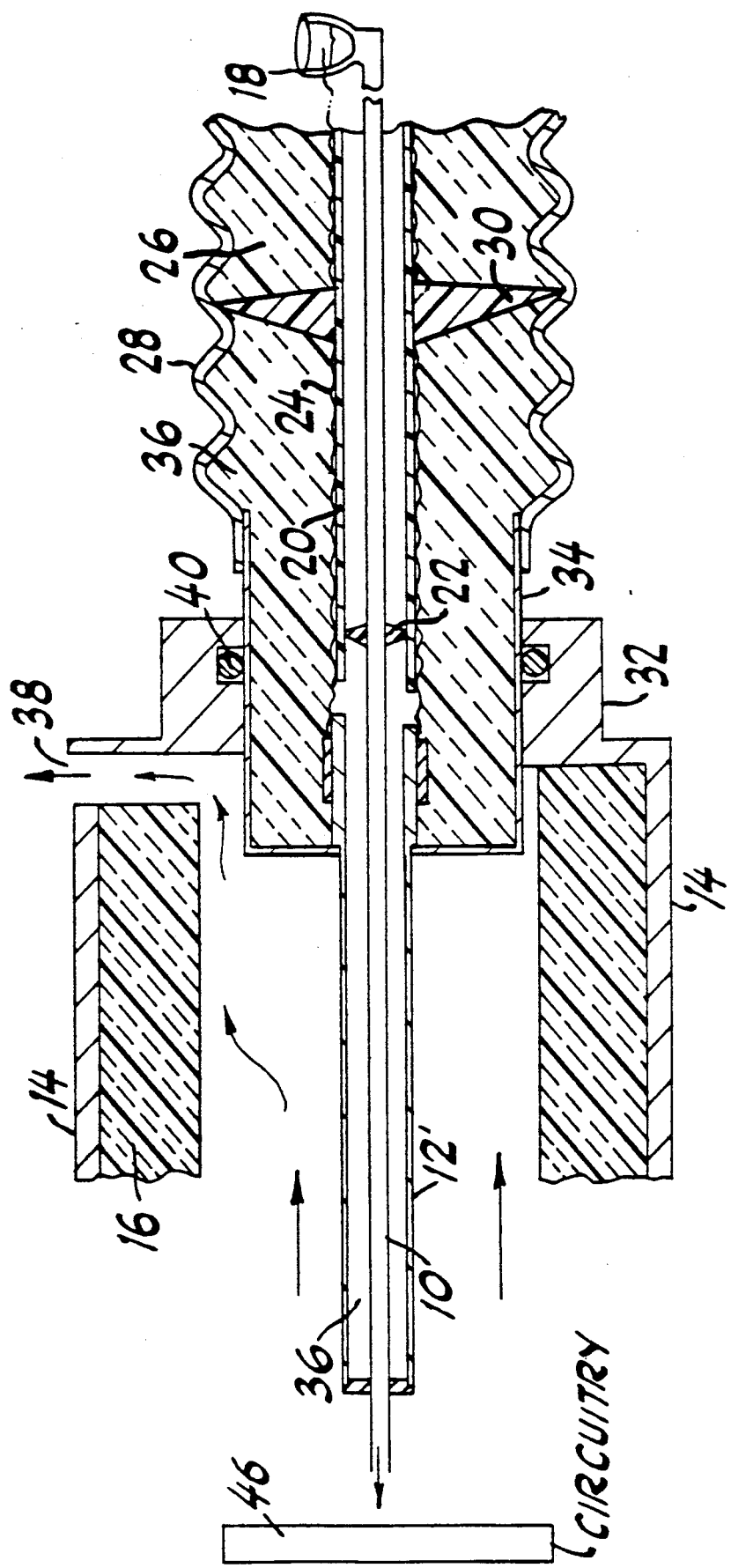
FIG. 2 is a cross-sectional view of another embodiment of the present invention.

Another embodiment of the invention, depicted in FIG. 2, does not use a finned heat sink. Instead, the delivery tube vacuum jacket 12' extends into the connector 34 and the shield 24 is connected to this vacuum jacket 12', by soldering or other means. In this embodiment, the vacuum jacket 12' acts as a heat sink, so that the impinging or conducted heat on the shield 24 is extracted by the flow of exhaust gas over the delivery jacket 12.

FIG. 2 also shows the shield 24 being connected to the supply dewar 18. By this connection, the shield 24 is cooled by the cold gases in the supply dewar 18. In the embodiment of FIG. 1, the shield 24 could also be connected to the supply dewar 18. Thus, the shield 24 is cooled at either or both of its ends according to the illustrated embodiments of the present invention.

The material to be used as the shield 24 should have a high thermal conductivity at temperatures near 100K and also have high flexibility. It is also advantageous if the material has a high degree of reflectivity in order to minimize the heat radiation load. Examples of materials which have these qualities are copper and aluminum. The shield 24 itself may be in the form of tape, braid or bellows, for example.

The provision of an inner shield that is continuously cooled as in the present invention allows a low-flow rate delivery capillary to be used in delivering coolant from a supply dewar to an area or object which is to be cooled.

What is claimed is:

1. A flexible transfer line for transferring cooling liquid between a first and a second point, comprising:
   a delivery capillary coupled to a supply of said liquid;
   an outer flexible support coaxial with said delivery capillary;
   an inner flexible shield positioned between said outer flexible support and said delivery capillary to provided thermal isolation of said delivery capillary from the ambient, with the shield having a low-thermal conductivity means disposed at its inside surface; and
   means for removing heat from said shield.

2. The transfer line of claim 1, wherein said means for removing heat is a heat sink thermally coupled to said shield and exposed to a cooling flow of gas.

3. The transfer line of claim 1, wherein said means for removing heat comprises a storage dewar containing said supply of said liquid, which dewar is thermally coupled to said shield.

4. The transfer line of claim 1, wherein said means for removing heat includes a heat sink exposed to a cooling flow of gas and a storage dewar containing the supply of cooling liquid to be transferred, said heat sink and said storage dewar being thermally coupled to said shield.

5. An arrangement for cooling circuitry, comprising:
   a housing which surrounds circuitry to be cooled;
   a storage dewar which contains a supply of coolant coupled to said cooling housing by a flexible transfer line;
   said flexible transfer line having a delivery capillary which delivers said coolant from said storage dewar into said housing to cool said circuitry, an outer flexible support coaxial with said delivery capillary, an inner flexible shield arranged between said outer flexible support and said delivery capillary to provide thermal isolation of the delivery capillary from the ambient, with the shield having a low-thermal conductivity means disposed at its inside surface; and means for cooling said shield.

6. The arrangement of claim 5, wherein said means of the transfer line for cooling is a heat sink exposed to a cooling flow of gas, which said heat sink is thermally coupled to said shield.

7. The arrangement of claim 5, wherein said means of the transfer line for cooling is a storage dewar containing said supply of said liquid, which said dewar is thermally coupled to said shield.

8. The arrangement of claim 5, wherein said means of the transfer line for cooling includes a heat sink exposed to a cooling flow of gas and a storage dewar containing said supply of said liquid, which said heat sink and said dewar are thermally coupled to said shield.

9. A flexible transfer line for transferring coolant between a supply of coolant and a coolant recipient, comprising:
- a delivery capillary coupled to a supply of coolant;
- an inner support tube coaxial to said delivery capillary, with the inner support tube to being of a low-thermal conductive material;
- an outer support coaxial to said inner support tube and said delivery capillary;
- inner spacers between said inner support tube and said delivery capillary which support said delivery capillary, with a first vacuum space being formed between said inner support tube and said delivery capillary;
- a cooled flexible shield disposed over said inner support tube and coaxial with said outer support, with said shield and said inner support tube thermally isolating the delivery capillary from ambient;
- outer spacers between said outer support and said shield, with a second vacuum space being formed between said outer support and said shield;
- superinsulation in said second vacuum space; and
- a connector piece, attached to said outer support, which couples a flexible transfer line to said coolant recipient.

10. The transfer line of claim 9, further comprising a finned heat sink arranged at one end of said connector piece such that fins of said heat sink are exposed to a cooling flow of gas in said coolant recipient, said heat sink having a projection into said connector piece that is thermally coupled to said shield, whereby said cooling flow of gas cools said shield.

11. The transfer line of claim 9, further comprising a delivery capillary vacuum jacket attached to said connector and coaxially surrounding a portion of said delivery capillary extending out of said connector piece into said coolant recipient such that said vacuum jacket is exposed to a cooling flow of gas in said coolant recipient, which said vacuum jacket projects into said connector piece and is thermally coupled to said shield, whereby said cooling flow of gas cools said shield.

12. A flexible transfer line for transferring coolant at a low-flow rate, comprising:
- a low-flow rate delivery capillary couplable to a source of said coolant;
- an outer flexible support coaxial with said delivery capillary; and
- a cooled flexible inner shield between said outer flexible support and said delivery capillary, with the shield having a low-thermal conductivity means disposed at its inside surface.

13. The transfer line of claim 12, wherein said inner shield includes a metal having the characteristics of high thermal conductivity, high flexibility and high reflectivity.

14. The transfer line of claim 12, wherein said inner shield is at least one of copper and aluminum.

15. A method of transferring coolant from a storage supply to an area to be cooled at a low-flow rate, comprising the steps of:
- delivering said coolant from said storage supply at a low-flow rate via a low-flow delivery capillary coupled between said storage supply and said area to be cooled;
- thermally isolating said delivery capillary from ambient, said isolating step including providing an outer flexible support coaxial and concentric with said delivery capillary and an inner flexible shield between said outer flexible support and said delivery capillary, with the shield having a low-thermal conductivity means disposed at its inside surface; and
- extracting heat from said inner flexible shield.

16. The method of claim 15, wherein the step of extracting heat includes the step of exposing to a cooling flow of gas a heat sink thermally connected to said inner flexible shield.

17. The method of claim 15, wherein the step of continuously extracting heat includes the step of exposing at least one end of said shield to a cooling flow of gas.

* * * * *

UNITED STATES PATENT AND TRADEMARK OFFICE
CERTIFICATE OF CORRECTION

PATENT NO. : 5,072,591
DATED : December 17, 1991
INVENTOR(S) : Grange et al.

It is certified that error appears in the above-identified patent and that said Letters Patent is hereby corrected as shown below:

Column 5, line 41, change "a flexible" to --said flexible--

5, line 41, change "said cool" to --a cool--

Signed and Sealed this

Fifth Day of April, 1994

Attest:

BRUCE LEHMAN

*Attesting Officer*   *Commissioner of Patents and Trademarks*